(12) United States Patent
Barbara et al.

(10) Patent No.: US 6,880,785 B2
(45) Date of Patent: Apr. 19, 2005

(54) RAPID-OPENING DOOR

(75) Inventors: Olivier Barbara, Merenvielle (FR); Stéphane Viala, Cornebarrieu (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/448,055

(22) Filed: May 30, 2003

(65) Prior Publication Data

US 2004/0000094 A1 Jan. 1, 2004

(30) Foreign Application Priority Data

Jun. 26, 2002 (FR) .............................. 02 07900

(51) Int. Cl.$^7$ .............................................. B64C 1/14
(52) U.S. Cl. .................. 244/118.5; 244/129.5
(58) Field of Search ..................... 244/118.5, 129.4, 244/129.5, 129.1; 49/496.1, 21, 31; 52/1; 454/76

(56) References Cited

U.S. PATENT DOCUMENTS

| | | | | |
|---|---|---|---|---|
| 3,775,915 A | * | 12/1973 | Chambers et al. ............... 52/1 |
| 4,033,247 A | * | 7/1977 | Murphy ....................... 454/76 |
| 4,133,852 A | * | 1/1979 | DiNicolantonio et al. ....................................................... 261/114.5 |
| 4,312,153 A | * | 1/1982 | Parkinson et al. ......... 49/496.1 |
| 4,703,908 A | | 11/1987 | Correge et al. |
| 5,822,924 A | | 10/1998 | Wijninga et al. |
| 6,669,144 B1 | * | 12/2003 | Artsiely ................... 244/129.5 |
| 2003/0047648 A1 | * | 3/2003 | Batt et al. ................ 244/118.5 |

FOREIGN PATENT DOCUMENTS

| WO | 8401404 | 4/1984 |
|---|---|---|
| WO | 8904907 | 6/1989 |

OTHER PUBLICATIONS

G. Norris; "Decompression risk is main hurdle in bid to design secure cockpit door barrier must withstand ramming force of 136kg food trolley but open in event of a pressure loss," Flight International, Reed Business Information, Haywards Heath, GB, vol. 160, No. 4802, Oct. 16, 2001, p. 18 XP001100398 ISSN: 0015–3710.

* cited by examiner

Primary Examiner—Galen Barefoot
(74) Attorney, Agent, or Firm—Stevens, Davis, Miller & Mosher, LLP

(57) ABSTRACT

Rapid-opening door.

According to the invention, on its face (1.4) immediately adjacent to the pressurized space (4), the door (1) is provided with a projecting lip (10.2) in the vicinity of its free edge (11), accelerating the opening of said door in the event of decompression of the space (5).

6 Claims, 2 Drawing Sheets

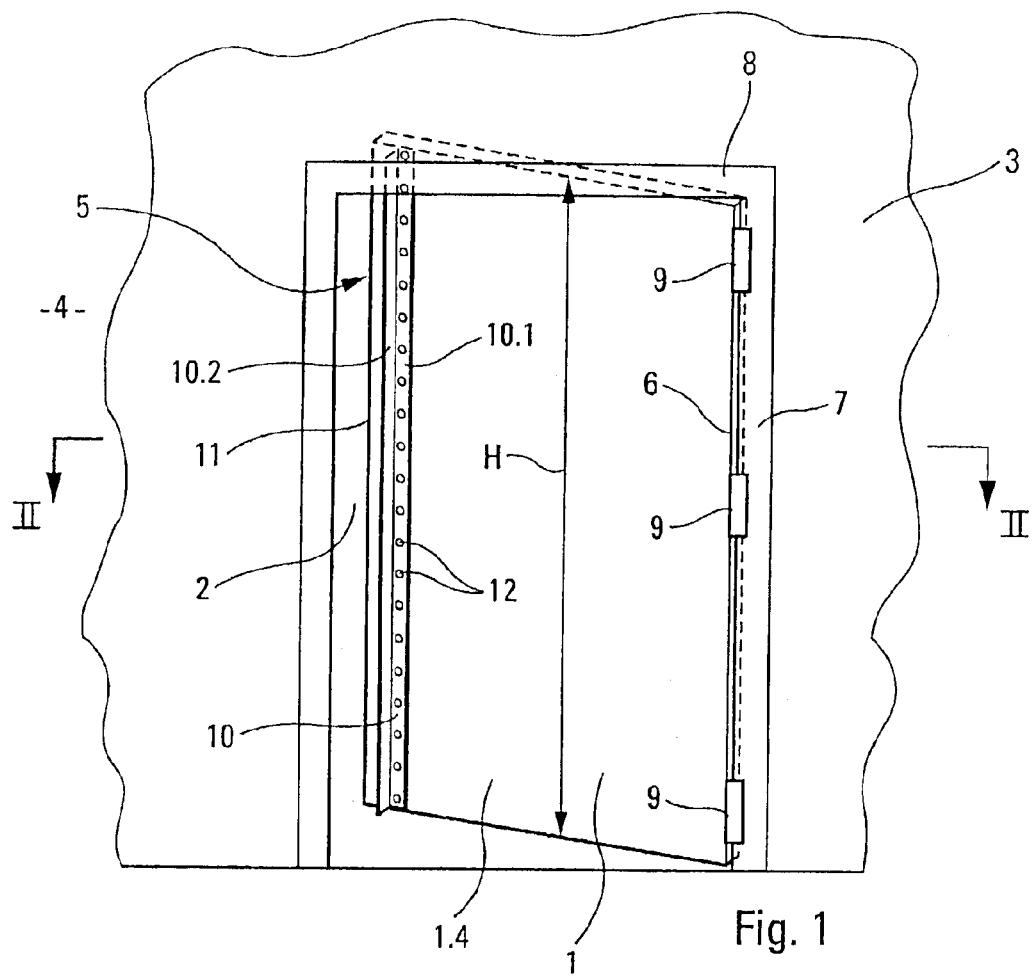
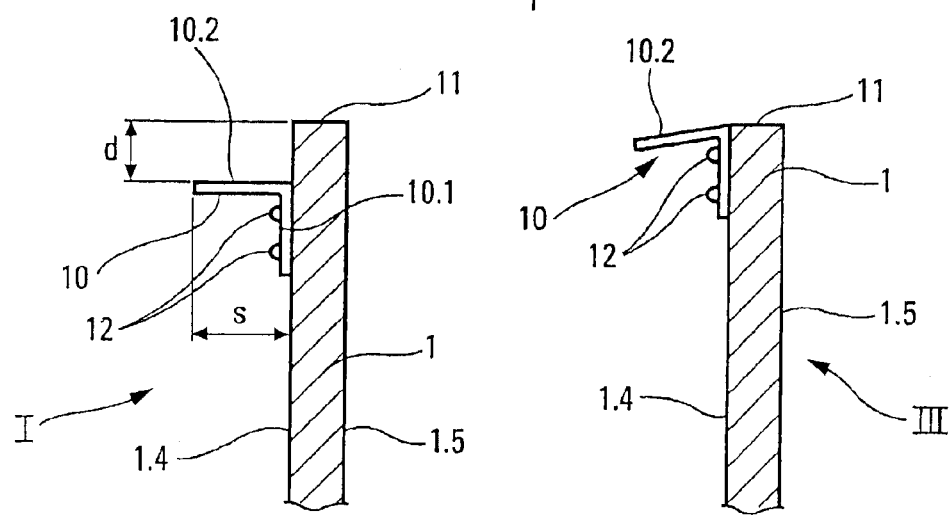

RAPID-OPENING DOOR

The present invention relates to a door that opens rapidly when its two faces are subjected to suddenly very different pressures. It is particularly but not exclusively appropriate for use in aircraft, for avoiding damage due to a sudden decompression of one space inside said aircraft.

It is known that commercial civil airplanes fly at high altitudes where the pressure is very low. It is therefore necessary during the flight to pressurize certain spaces within these airplanes, such as the passenger cabin, the flight deck or certain baggage compartments, to avoid the consequences of these low pressures on human beings and the cargo.

However, it is possible for one or more of these pressurized spaces to suffer violent decompression, causing major damage to the airplane.

This damage is caused by the pressure difference between the pressurized spaces of the airplane and those which suffer decompression. The structures are then subjected to enormous forces for which they were not designed and which can cause structural problems and even failure.

Various solutions have been put forward for preventing such damage. To take one example, document FR-2 306 877 (U.S. Pat. No. 4,703,908) may be cited. These solutions generally consist of devices for eliminating or limiting the pressure differences between the different spaces.

Various causes can bring about violent decompression of the passenger cabin, flight deck or pressurized baggage compartments. For example, a door not properly closed may come open in flight, a window or windshield component may break or an opening may appear in the structure following an impact or an explosion.

A breach in the flight deck, whatever its origin (impact, explosion, etc.), produces an immediate decompression of said flight deck. The large pressure difference which then develops between the flight deck and the passenger cabin sets up loads on the structures between these two cabins, such as door and bulkheads. These structures, for reasons of weight (especially the bulkheads), are not however designed to withstand such loads. Moreover, because the door between the passenger cabin and the flight deck is usually closed for security reasons, it cannot open, under the effect of the large pressure difference, with sufficient speed to allow the pressures to quickly attain equilibrium. Said structures could therefore be damaged.

The object of the present invention is to solve this problem by accelerating the opening of such a door.

To this end, according to the invention, the door closing an opening in a wall separating a first space and a second space, the pressures in which are at least approximately equal, it being possible for the pressure in said second space to drop violently to a very low value and said door being hinged on one of its edges to one side of said opening, is noteworthy in that it possesses, on its face immediately adjacent to said first space and in the vicinity of the free edge of said door furthest from said hinged edge, at least one lip projecting from said face immediately adjacent to said first space.

The reason for this is that the applicant has found that the comparative slowness with which a door between such spaces comes open, where one of the spaces is subjected to violent decompression, arises from a phenomenon whereby gaseous currents follow the contours of the door as they attempt to temporarily equalize the pressures on either side of the door. This premature equalizing of the pressures on the door slows the speed at which the door opens, delaying the complete equalization of the pressures between said first and second spaces and prolonging the loads applied to the surrounding structures, leading to damage or even destruction of said structures.

By contrast, with the present invention, said lip resists the equalization of the pressures on either side of the door due to contour following, so that the pressure in said first space acts for longer on said door, allowing it to open rapidly into said second space.

The following advantageous features of the present invention may be cited:

said projecting lip is parallel to said free edge of the door;

the distance between said projecting lip and said free edge is less than or equal to the height of said projecting lip from said face immediately adjacent to said first space;

said projecting lip extends all the way along that dimension of the door which is parallel to said free edge; and said projecting lip is at least approximately perpendicular to said face immediately adjacent to said first space.

Said projecting lip preferably belongs to an angle bar, the other lip of which is placed against said face immediately adjacent to said first space and is used to fix said angle bar to said door.

Thus, in addition to accelerating the opening of said door, said angle bar increases the mechanical strength of the door, so that there is less damage to said door.

The present invention and its advantages are of course independent of the direction of the hinge axis of the door, which may for example be horizontal or vertical. However, in the example described below with reference to the figures, the door is hinged about a vertical axis, as is the case with a door separating, in an airplane, the flight deck from the passenger cabin.

The figures of the attached drawing will show clearly how the invention can be carried out. In these figures, identical references denote similar parts.

FIG. 1 illustrates, in perspective and in a partially open position, a door in accordance with the present invention.

FIG. 3 shows, in section and on a larger scale, the free edge of the door shown in FIGS. 1 and 2.

FIG. 6 shows, in cross section and on a larger scale, the free edge of the door shown in FIG. 5.

Figure 2:
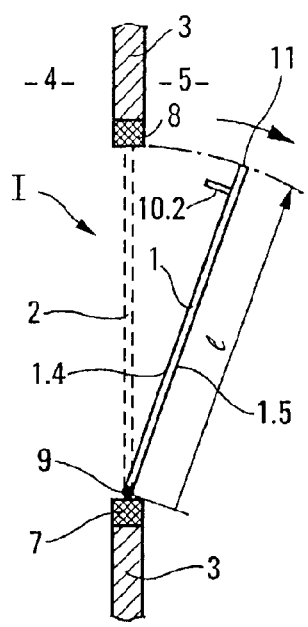
FIG. 2 is a partial and schematic cross section taken on the line marked II—II in FIG. 1.

The door 1, shown slightly open in FIGS. 1 and 2, is designed to close an opening 2 in a wall 3. The wall 3 separates from each other the spaces 4 and 5, the pressures in which are at least approximately equal.

The door 1 therefore comprises, when standing closed in the opening 2, one face 1.4 immediately adjacent to the space 4 and one face 1.5 immediately adjacent to the space 5.

The door 4 is hinged on its edge 6 to a jamb 7 of its door frame 8, defining the opening 2 in the wall 3. To this end, hinges 9 are fitted between the hinge edge 6 and the jamb 7. In the example shown in the drawings, said hinge edge 6 and the jamb 7 are vertical and the door 1 has a height indicated by the reference H. The (horizontal) width of said door 1 is denoted l.

As indicated above, it is assumed that the pressure in the space 5 may drop accidentally and violently to a very low value, for example the value encountered at the cruising altitude of modern airplanes, and it is wished to minimize the effects of such a pressure drop when this occurs while the door 1 is closed and separating the spaces 4 and 5 from each other.

For this purpose, in the embodiment illustrated in FIGS. 1, 2 and 3, an angle bar 10 has been fixed to the face 1.4 of the door 1, in the vicinity of the free edge 11 furthest from the hinge edge 6. The angle bar 10 comprises a lip 10.1 placed on said face 1.4 and fixed to the door 1 by fixing means 12, such as screws.

The other lip 10.2 of the angle bar 10 is perpendicular and projects from said face 1.4. It is parallel to said free edge 11 and extends the full height H of the door 1. The distance d between said lip 10.2 and the free edge 11 is preferably less than or equal to the height s of the projection of said lip 10.2 from said face 1.4.

Figure 4:
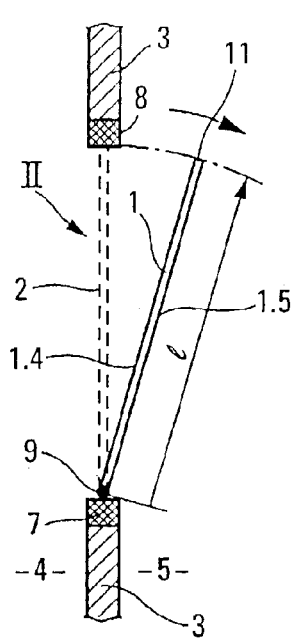
FIG. 4 illustrates, in a view similar to FIG. 2, a door identical to that of FIGS. 1 and 2, but without the improvement of the invention.
Figure 7:
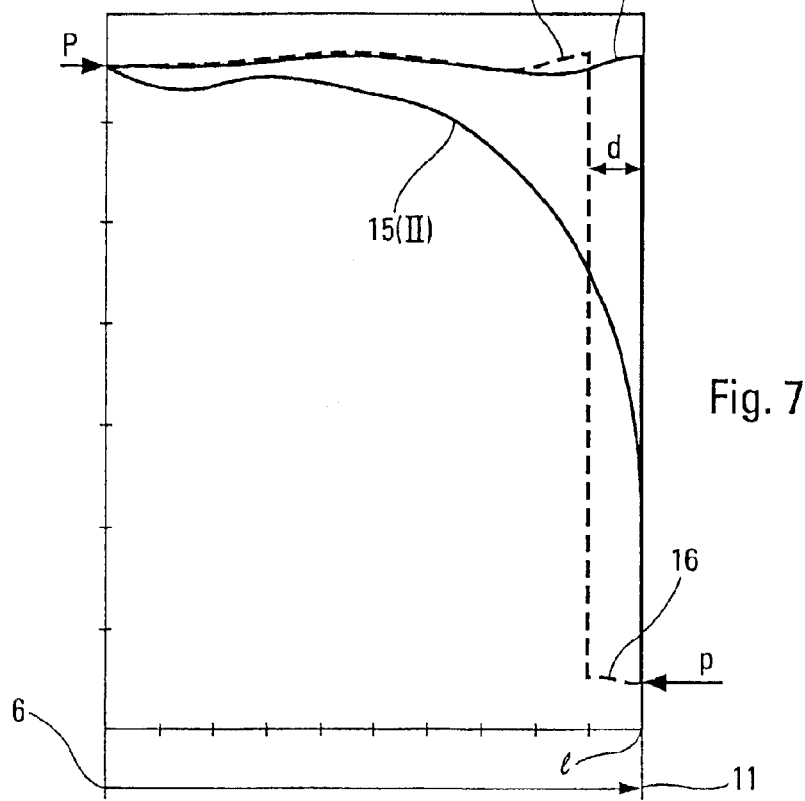
FIG. 7 is a numerical diagram comparing the behaviors of the doors shown in FIGS. 2, 4 and 5 in the event of violent decompression.

To evaluate the performance of the present invention, the door arrangement seen in FIGS. 1, 2 and 3, denoted by the reference I in FIG. 2, was compared with an identical door arrangement (shown in FIG. 4 and denoted II), but without the projecting lip 10.2, and the diagram shown in FIG. 7 was drawn. In this diagram, the x-axis represents a horizontal distance parallel to the width of the door 1, the origin of the x-axis corresponding to the hinge edge 6 while the x value l corresponds to the free edge 11. The y-axis shows the pressure variations on the face 1.4 of the door arrangements I and II, the pressure p corresponding to the pressure of the spaces 4 and 5 before the space 5 is decompressed, and the pressure p corresponding to the pressure in said space 5 after decompression. The diagram shown in FIG. 7 furthermore corresponds to the doors being opened at an angle of 45°.

If in this diagram the curve 15 is examined, which corresponds to the door arrangement II, it will be seen that from the midpoint (approximately) of the width l of the door 1 in this arrangement, the pressure on the face 1.4 of the door declines toward the pressure p in the decompressed space 5. As explained above, this is due to the contour-following phenomenon whereby the pressures on the two sides of the door tend to equalize rapidly so that it opens slowly.

The curve 16 of the diagram shown in FIG. 7, on the other hand, which corresponds to the door arrangement I in accordance with the present invention, shows that the pressure P on the face 1.4 remains virtually constant all the way across the width l of the door 1 and declines suddenly behind the position of the projecting lip 10.2. The pressure P in the space 4 acts on a much greater portion of the door than the door arrangement II. This means that a large moment of pressure continues to be applied to the door 1 as it opens, which makes it open much faster. The surrounding structures are therefore subjected to the pressure loads for a much shorter period.

Figure 5:
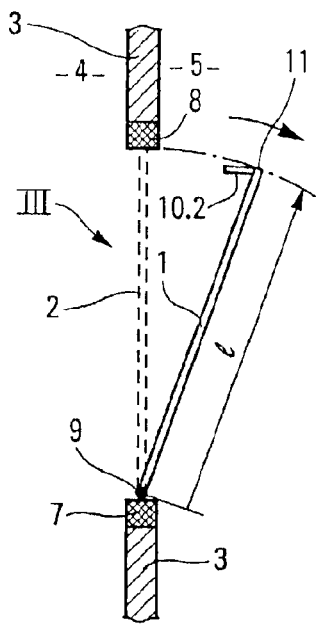
FIG. 5 illustrates, in a view similar to FIG. 2, an alternative embodiment of the door in accordance with the present invention.

FIGS. 5 and 6, meanwhile, show an alternative embodiment III of the present invention, in which the angle bar 10 is fixed immediately adjacent to the free edge 11 (d=0). In addition, in order to ensure that there is no impedance to the opening of the door 1, the lip 10.2 is then slightly back toward the door, so that the angle between this lip 10.2 and the door 1 is less than 90°, for example equal to 87°. The distribution of pressure across the face 1.4 of this door is shown by the curve 17 in FIG. 7. It can be seen here that, in the event of decompression in the space 5, there is no pressure drop on the face 1.4. The pressure remains constant on this face for a very long time, enabling the door to open very rapidly.

What is claimed is:

1. A door for closing an opening in a wall separating a first space and a second space, the pressures in which are at least approximately equal, though the pressure in said second space may drop accidentally and violently to a very low value, said door comprising:

a hinge that is for hinging said door on one of its edges to one side of said opening;

a first face for being disposed immediately adjacent to said first space;

a second face for being disposed immediately adjacent to said second space; and at least one lip projecting from said first face and disposed in the vicinity of a free edge of said door that is farthest from said hinged edge, wherein:

in the event of an accidental and violent drop of pressure in said second space, said lip opposes the rapid equalization of the pressures between said first face and said second face, thus allowing said door to open rapidly into said second space.

2. The door as claimed in claim 1, in which said projecting lip is arranged for being parallel to said free edge.

3. The door as claimed in claim 1, in which the distance between said projecting lip and said free edge is less than or equal to the height of said projecting lip from said first face.

4. The door as claimed in claim 1, in which said projecting lip extends all the way along a dimension of the door which is arranged for being parallel to said free edge.

5. The door as claimed in claim 1, in which said projecting lip is at least approximately perpendicular to said first face.

6. The door as claimed in claim 1, in which said projecting lip belongs to an angle bar, the other lip of which is placed against said first face and is used to fix said angle bar to said door.

* * * * *